United States Patent
Arena et al.

(10) Patent No.: US 11,294,534 B2
(45) Date of Patent: Apr. 5, 2022

(54) TECHNOLOGY ADAPTED TO PROVIDE A USER INTERFACE VIA PRESENTATION OF TWO-DIMENSIONAL CONTENT VIA THREE-DIMENSIONAL DISPLAY OBJECTS RENDERED IN A NAVIGABLE VIRTUAL SPACE

(71) Applicant: Unbnd Group Pty Ltd, Canberra (AU)

(72) Inventors: Antony Arena, Queenscliff (AU); Duncan Henderson, Queenscliff (AU)

(73) Assignee: Unbnd Group Pty Ltd, Canberra (AU)

( * ) Notice: Subject to any disclaimer, the term of this patent is extended or adjusted under 35 U.S.C. 154(b) by 313 days.

(21) Appl. No.: 16/683,050

(22) Filed: Nov. 13, 2019

(65) Prior Publication Data

US 2020/0150849 A1 May 14, 2020

(51) Int. Cl.
| | |
|---|---|
| *G06F 3/048* | (2013.01) |
| *G06F 3/04815* | (2022.01) |
| *G06F 3/0488* | (2022.01) |
| *G06T 15/10* | (2011.01) |
| *G06F 3/0346* | (2013.01) |

(52) U.S. Cl.
CPC ........ *G06F 3/04815* (2013.01); *G06F 3/0346* (2013.01); *G06F 3/0488* (2013.01); *G06T 15/10* (2013.01); *G06F 2203/04803* (2013.01); *G06T 2200/24* (2013.01)

(58) Field of Classification Search
CPC .. G06F 3/04815; G06F 3/0346; G06F 3/0488; G06T 15/10
See application file for complete search history.

(56) References Cited

U.S. PATENT DOCUMENTS

| 9,208,592 B2* | 12/2015 | Borchardt | G06F 16/93 |
|---|---|---|---|
| 11,010,646 B2* | 5/2021 | Hall | G06T 7/73 |
| 2013/0212538 A1* | 8/2013 | Lemire | G06T 19/00 715/850 |
| 2018/0144547 A1* | 5/2018 | Shakib | G06T 15/60 |
| 2018/0348985 A1* | 12/2018 | Shelby | G06F 3/0482 |
| 2019/0065026 A1* | 2/2019 | Kiemele | G02B 27/0172 |
| 2019/0104324 A1* | 4/2019 | Han | G06F 3/04815 |
| 2021/0132898 A1* | 5/2021 | Lee | G06F 3/0346 |

* cited by examiner

*Primary Examiner* — David E Choi
(74) *Attorney, Agent, or Firm* — TraskBritt (57) ABSTRACT

Embodiments of the present disclosure described herein relate to techniques for presenting video accompanying digital content on a mobile device in a manner that does not obstruct the associated video stream. Embodiments also allow any desired amount or type of video accompanying digital content to be delivered without congestion, thereby maximizing the user experience and/or revenue associated with providing the streaming service. In embodiments described below, this is achieved by leveraging technology that has been adapted for presentation of three dimensional virtual content via a virtual reality (VR) or augmented reality (AR) interface, and adapting that technology for the presentation of two dimensional content (e.g., two-dimensional video objects) in a traditional display screen environment (i.e., outside of a VR/AR context). In that regard, some embodiments relate to technology adapted to provide a user interface via presentation of two-dimensional content via three-dimensional display objects rendered in a navigable virtual space.

20 Claims, 7 Drawing Sheets

TECHNOLOGY ADAPTED TO PROVIDE A USER INTERFACE VIA PRESENTATION OF TWO-DIMENSIONAL CONTENT VIA THREE-DIMENSIONAL DISPLAY OBJECTS RENDERED IN A NAVIGABLÉ VIRTUAL SPACE

PRIORITY CLAIM

This application claims the benefit of the filing date of Australian Patent Application Serial No. AU 2019902055, filed Jun. 12, 2019, and claims the benefit of the filing date of Australian Patent Application Serial No. AU 2018904297, filed Nov. 13, 2018, the contents and disclosure of each of which is hereby incorporated herein in its entirety by this reference.

TECHNICAL FIELD

The present disclosure relates generally to digital user interfaces, for example, for mobile devices. Some embodiments relate to technology adapted to provide a user interface via presentation of two-dimensional content via three-dimensional display objects rendered in a navigable virtual space.

BACKGROUND

Any discussion of the background art throughout the specification should in no way be considered as an admission that such art is widely known or forms part of common general knowledge in the field.

The ubiquity of high-speed data networks has, in recent years, resulted in a dramatic increase in the amount of digital video content being generated and consumed. The demand for video content, particularly over mobile devices (e.g., tablets and phones), has resulted in new and efficient techniques for delivering high-quality digital video content to viewers. For example, dedicated content streaming services are accessible by mobile devices for all manner of content types, including live sport broadcasts, movies, TV shows and webcasts.

In many instances, it is desirable to present video accompanying digital content in association with the content being streamed to the mobile device user. For example, during a live sports stream, it may be desirable to show player statistics at contextually relevant times. Such information may also include paid advertising that is presented for a period of time.

However, current techniques for displaying such video accompanying digital content typically involves presenting the information overlaying the streamed content, which necessarily obstructs some portion of the content.

In a mobile context, where screen real estate is already at a premium, obstructing the already compacted video image can be particularly problematic and is known to adversely affect the overall user experience. Indeed, users may choose not to use a streaming service that is heavy on video accompanying digital content, even though such content may ultimately be beneficial to the user.

It would be advantageous if there was provided a technique for presenting video accompanying digital content on a mobile device that did not obstruct the associated video stream. It would also be advantageous if such a technique allowed for streaming service providers to deliver any desired amount or type of video accompanying digital content so as to maximize the user experience and/or revenue associated with providing the streaming service.

BRIEF SUMMARY

In accordance with a first aspect of the present disclosure, there is provided a computer implemented method for providing video accompanying digital content on a display of a mobile device, the method comprising: displaying a video stream on the mobile device display in a two-dimensional display format; responsive to determining an instruction (optionally a user instruction) for the video accompanying digital content, causing the display of the mobile device to transition from the two-dimensional display format to a three-dimensional display format, the transition step comprising: rendering the video stream and video accompanying digital content as separate objects within a three-dimensional virtual space such that each of the video accompanying digital content objects are displayed in a different spatial location to the video stream object thereby ensuring that the video stream displayed by the corresponding object is unobstructed by the video accompanying digital content.

In an embodiment, when in the three-dimensional display format, the three-dimensional virtual space can be navigated by a user of the mobile device to view a desired one or more of the rendered objects, the navigation affected by movement of the mobile device in real space.

In an embodiment, movement of the mobile device is determined based on an output of a gyroscope embedded in the mobile device.

In an embodiment, when in the three-dimensional display format, the user views the three-dimensional virtual space through a virtual camera located in the center of the virtual space such that movement of the mobile device simulates looking around the virtual space.

In an embodiment, the orientation of the virtual camera is adjusted based on the output of the gyroscope.

In an embodiment, the output of the gyroscope is representative of a pitch, yaw and roll of the mobile device.

In an embodiment, the rendered objects are spatially anchored within the three-dimensional virtual space.

In an embodiment, when in the two-dimensional display format, the video stream is mapped and displayed in a three-dimensional image plane that is sized and aligned to the aspect ratio and local orientation of the display of the mobile device.

In an embodiment, the step of transitioning comprises transforming the three-dimensional image plane.

In an embodiment, the image plane is attached to the mobile device's local camera and wherein the step of transitioning further comprises changing a coordinate space from a local camera coordinate system to a virtual space coordinate system while retaining the transform of the image plane relative to the local camera.

In an embodiment, when in the three-dimensional format, the image plane interpolates over time from original transform to anchored virtual space transform.

In an embodiment, responsive to determining an instruction for returning to the two-dimensional format, the method further comprises hiding the three-dimensional virtual space and re-snapping the image plane to the display of the mobile device for full screen viewing.

In an embodiment, the step of returning to the two-dimensional format further comprises changing the coordinate space from the virtual space coordinate system to the local camera coordinate system while retaining the transform of the image plane relative to the local camera.

In an embodiment, when in two-dimensional format, the image plane interpolates over time from original transform to new local camera aligned transform.

In an embodiment, the instruction is a predefined touch screen gesture.

In an embodiment, the video stream is a live video stream.

In an embodiment, the video accompanying digital content is dynamic content associated with the live video stream.

In an embodiment, the dynamic content is loaded, synchronized with the video stream content and kept in background processes while in the two-dimensional display format.

In an embodiment, the video accompanying digital content is user interactive content that is contextually relevant to the video stream and wherein the method further comprises allowing the user to interact with the interactive content through predefined user gestures.

In an embodiment, the video accompanying digital content comprises feedback that is presented in an associated object at moments of interest determined using artificial intelligence.

In an embodiment, the method further comprises rendering a user interface object in the virtual space that is operable to allow a user to input predefined phrases and/or emoticons that are displayed to other users in a live feed.

In an embodiment, at least one of the video accompanying digital content objects is located in the virtual space adjacent to the video stream object.

In accordance with a second aspect there is provided a computer system for providing video accompanying digital content on a mobile device, the system comprising: a video server configured to stream video to the mobile device over a mobile communications network; a content server configured to communicate the video accompanying digital content to mobile device over the mobile communications network; wherein the mobile device is operable to display the video stream in a two-dimensional display format; and responsive to determining an instruction for the video accompanying digital content, cause the display of the mobile device to transition from the two-dimensional display format to a three-dimensional display format, the transition step comprising: rendering the video stream and video accompanying digital content as separate objects within a three-dimensional virtual space such that each of the video accompanying digital content objects are displayed in a different spatial location to the video stream object thereby ensuring that the video stream displayed by the corresponding object is unobstructed by the video accompanying digital content.

One embodiment provides a computer implemented method for providing a navigable video-centric user interface on a mobile device having a display screen, the method including:
rendering of a video content display object on the display screen, wherein the video content display object is configured to present two-dimensional video data retrieved from a video data source, wherein the rendering includes rendering the video content display object as a three-dimensional object in a three-dimensional virtual space, such that the video content display object includes a two-dimensional display pane on which the two dimensional video data is presented;
rendering in the three-dimensional virtual space one or more further content display objects, the one or more further content display objects being configured to present two-dimensional content retrieved from respective two-dimensional content data sources; and
enabling field-of-view navigation of the three-dimensional virtual space via user inputs delivered to the mobile device, thereby to allow a user of the mobile device to selectively view desired portions of the video content display object and one or more further content display objects.

One embodiment provides a computer implemented method for providing data to a navigable video-centric user interface on a mobile device having a display screen, wherein the mobile device is configured to perform a method including:
rendering a three-dimensional virtual space;
rendering in the three-dimensional virtual space a plurality of content display objects, wherein each content display object includes two-dimensional display pane configured for presenting two-dimensional content;
data mapping each of the content display objects with a source of two-dimensional rendering content, such mobile device is operable to retrieve from respective designated locations two dimensional content for display by the content display objects, such that the two-dimensional content is transformed and presented in the three-dimensional virtual space;
enabling field-of-view navigation of the three-dimensional virtual space via user inputs delivered to the mobile device, thereby to allow a user of the mobile device to selectively view desired portions of the video content display object and one or more further content display objects.

One embodiment provides a method for displaying content at a mobile device having a display screen, the method including:
configuring the mobile device to render a three-dimensional virtual space;
being responsive to an input to transition in a visually seamless manner between:
a first mode, which includes rendering a content display object to occupy substantially all of the display screen, wherein the content display object is configured to display two-dimensional content; and
a second mode, which includes rendering a three-dimensional content display object in the three-dimensional virtual space, wherein the three-dimensional display object displays the same two-dimensional content;
such that by transitioning from the first mode to the second mode, the user is able to continue seamlessly viewing the two-dimensional content, and navigate the three-dimensional virtual space thereby to in parallel view one or more further content display objects respectively configured to display dynamic content retrieved from remote content sources.

Reference throughout this specification to "one embodiment," "some embodiments" or "an embodiment" means that a particular feature, structure or characteristic described in connection with the embodiment is included in at least one embodiment of the present disclosure. Thus, appearances of the phrases "in one embodiment," "in some embodiments" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

As used herein, the term "exemplary" is used in the sense of providing examples, as opposed to indicating quality. That is, an "exemplary embodiment" is an embodiment provided as an example, as opposed to necessarily being an embodiment of exemplary quality.

The description below refers to "systems" and "modules." The term "module" refers to a software component that is logically separable (a computer program), or a hardware component. The module of the embodiment refers to not only a module in the computer program but also a module in a hardware configuration. The discussion of the embodiment also serves as the discussion of computer programs for causing the modules to function (including a program that causes a computer to execute each step, a program that causes the computer to function as means, and a program that causes the computer to implement each function), and as the discussion of a system and a method. For convenience of explanation, the phrases "stores information," "causes information to be stored," and other phrases equivalent thereto are used. If the embodiment is a computer program, these phrases are intended to express "causes a memory device to store information" or "controls a memory device to cause the memory device to store information." The modules may correspond to the functions in a one-to-one correspondence. In a software implementation, one module may form one program or multiple modules may form one program. One module may form multiple programs. Multiple modules may be executed by a single computer. A single module may be executed by multiple computers in a distributed environment or a parallel environment. One module may include another module. In the discussion that follows, the term "connection" refers to not only a physical connection but also a logical connection (such as an exchange of data, instructions, and data reference relationship). The term "predetermined" means that something is decided in advance of a process of interest. The term "predetermined" is thus intended to refer to something that is decided in advance of a process of interest in the embodiment. Even after a process in the embodiment has started, the term "predetermined" refers to something that is decided in advance of a process of interest depending on a condition or a status of the embodiment at the present point of time or depending on a condition or status heretofore continuing down to the present point of time. If "predetermined values" are plural, the predetermined values may be different from each other, or two or more of the predetermined values (including all the values) may be equal to each other. A statement that "if A, B is to be performed" is intended to mean "that it is determined whether something is A, and that if something is determined as A, an action B is to be carried out." The statement becomes meaningless if the determination as to whether something is A is not performed.

The term "system" refers to an arrangement where multiple computers, hardware configurations, and devices are interconnected via a communication network (including a one-to-one communication connection). The term "system," and the term "device," also refer to an arrangement that includes a single computer, a hardware configuration, and a device. The system does not include a social system that is a social "arrangement" formulated by humans.

At each process performed by a module, or at one of the processes performed by a module, information as a process target is read from a memory device, the information is then processed, and the process results are written onto the memory device. A description related to the reading of the information from the memory device prior to the process and the writing of the processed information onto the memory device subsequent to the process may be omitted as appropriate. The memory devices may include a hard disk, a random-access memory (RAM), an external storage medium, a memory device connected via a communication network, and a ledger within a CPU (Central Processing Unit).

BRIEF DESCRIPTION OF THE DRAWINGS

Features and advantages of embodiments the present disclosure will become apparent from the following description of embodiments thereof, by way of example only, with reference to the accompanying drawings, in which.

DETAILED DESCRIPTION

Embodiments of the present disclosure described herein relate to techniques for presenting video accompanying digital content on a mobile device in a manner that does not obstruct the associated video stream. Embodiments also allow any desired amount or type of video accompanying digital content to be delivered without congestion, thereby maximizing the user experience and/or revenue associated with providing the streaming service. In embodiments described below, this is achieved by leveraging technology that has been adapted for presentation of three dimensional virtual content via a virtual reality (VR) or augmented reality (AR) interface, and adapting that technology for the presentation of two dimensional content (e.g., two-dimensional video objects) in a traditional display screen environment (i.e., outside of a VR/AR context). In that regard, some embodiments relate to technology adapted to provide a user interface via presentation of two-dimensional content via three-dimensional display objects rendered in a navigable virtual space.

Example Process Flow

Figure 1:
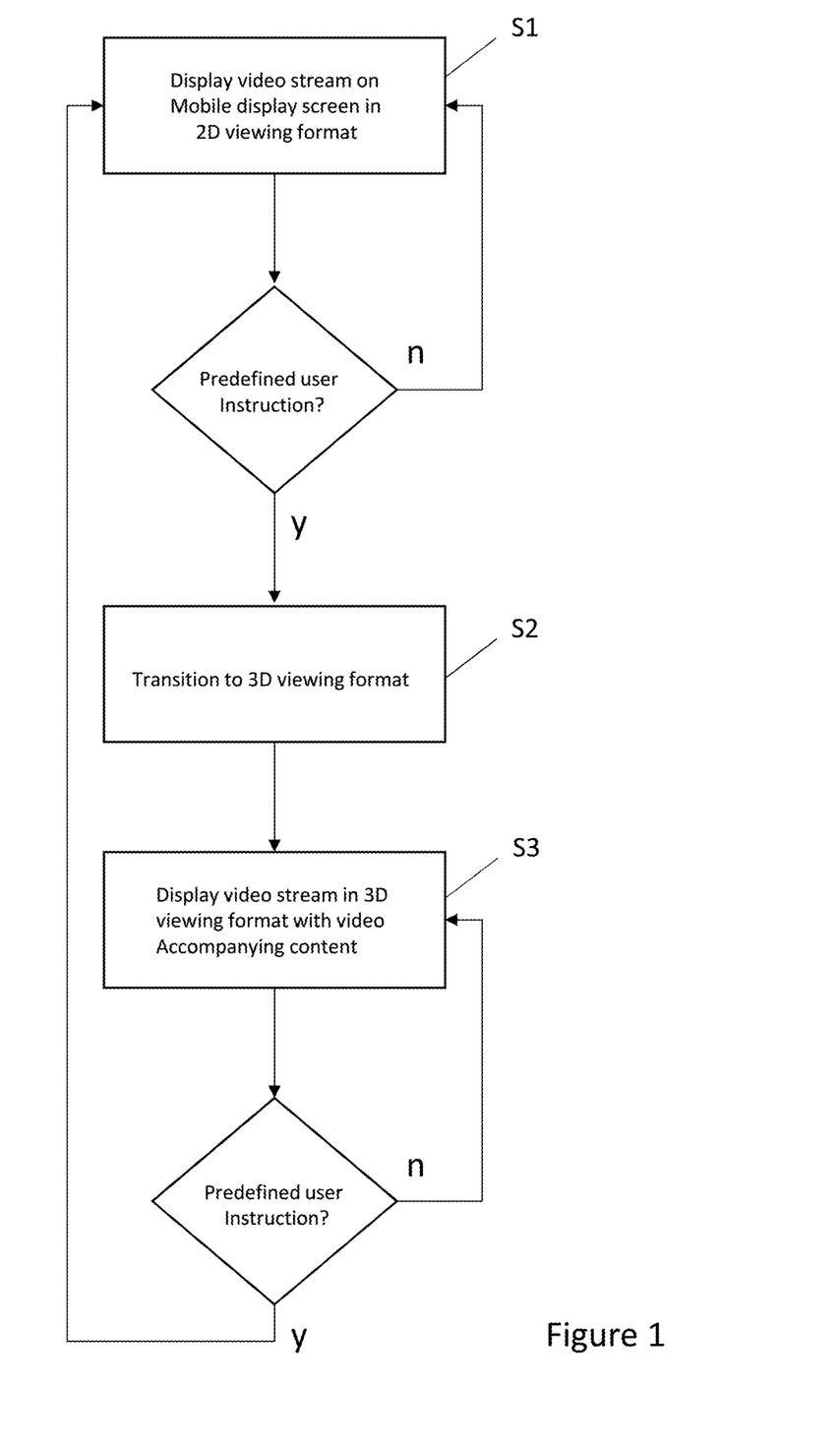
FIG. 1 is a basic process flow for an embodiment of the present disclosure.

With reference to FIG. 1, there is shown an example process flow for delivering video accompanying digital content to a user of a mobile device. The mobile device may comprise a phone, tablet or other like handheld device on which a user can view video in small screen form. In examples described below, the mobile device additionally preferably includes an IMU (inertial measurement unit) or other hardware that enables measurement of device movement.

The method comprises an initial step S1 of displaying a video stream on a display screen of the mobile device. The video stream is displayed in a two-dimensional display format (hereafter "2D format"), preferably occupying the entire display screen. At step S2, responsive to receiving an instruction (for example, a user instruction or a system-generated instruction) for video accompanying digital content, the method comprises causing the display to transition from the 2D format to a three-dimensional display format ("3D format").

More particularly, the step of transitioning comprises rendering the video stream and video accompanying digital content as separate objects within a three-dimensional virtual space such that each of the video accompanying digital content objects are displayed in a different spatial location to the video stream object. Such rendering in a three-dimensional space advantageously ensures that the video stream displayed by the corresponding object is unobstructed by the video accompanying digital content. As will become evident in subsequent paragraphs, transitioning to three-dimensional space also allows for any desired amount of video accompanying digital content to be presented without congestion.

The video stream is continued to be displayed in 3D format (step S3) until a further predefined form of instruction is received (for example, a user instruction, such as a double tap gesture), responsive to which the method returns to step S1 whereat the display returns to 2D format.

The transition from a 2D format to a 3D format may include either: (i) presenting the video initially via a display object that is configured to be rendered in a three dimensional virtual environment, but in a state where it is transformed to occupy a fixed area of the screen that has an aspect ratio matching the video (in such a state the video object is in a "basic" state, requiring no 3D transformation), and then allowing that display object to become unfixed with respect to the fixed area of the screen such that it is bound to a specific location defined in a navigable three-dimensional virtual space, preferably initially set rearwardly relative to when in the 2D format so as to occupy a lesser area of the screen following the transition, and the object is subsequently transformed based on the user's view of the object in that three-dimensional virtual space; or (ii) presenting the video initially as a conventional video display object, and in response to a trigger event transitioning to a video display object that is inherently configured to be rendered in a three dimensional virtual environment, and allowing navigation of that environment (with a substantially seamless frame-to-frame continuation across the transition).

General System Architecture

Figure 2:
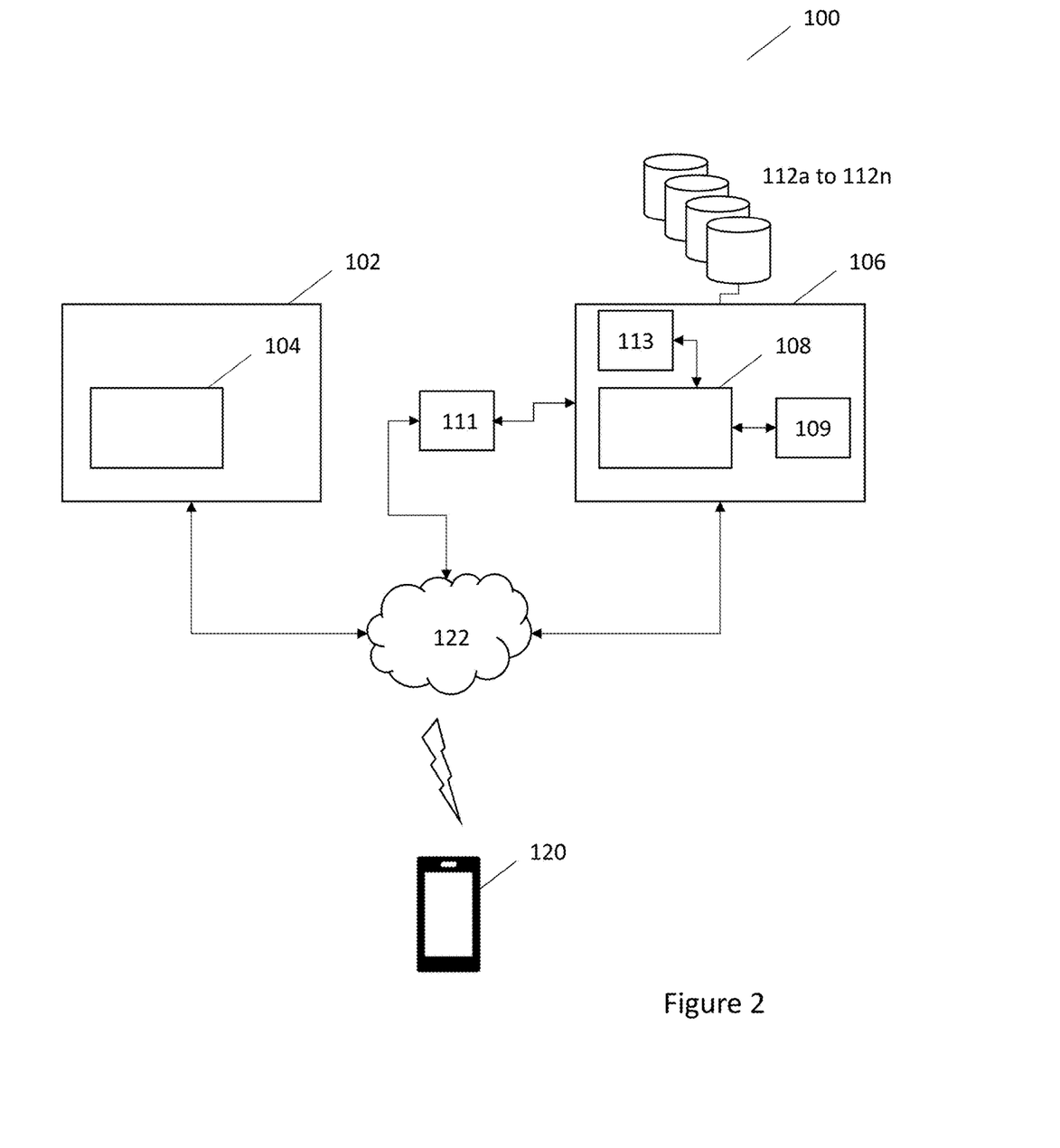
FIG. 2 is a schematic of a system for implementing an embodiment of the present disclosure.

With reference to FIG. 2, there is shown a schematic representation of computer system 100 in accordance with an embodiment of the present disclosure.

The computer system 100 comprises a mobile streaming service 102 having the requisite channels, programs, and streaming endpoints for streaming video to mobile devices. The computer system 100 additionally comprises a digital asset provider 106 implementing an event analysis service 109. A quick chat service 111 and third-party digital asset providers 112a to 112n also form part of the computer system 100.

In more detail, the video streaming service 102 comprises a streaming server 104 configured to stream either live, linear, or on-demand content to a mobile device 120 using techniques well understood in the art. According to the embodiment described herein, MPEG-Dash adaptive bitrate streaming technology is used for compressing and encoding streaming video, though any suitable streaming technology could be utilized.

The digital asset provider 106 implements a digital asset server 108 configured to deliver video accompanying digital content (hereafter "digital asset data") for accompanying video being streamed to the mobile device 120 by the streaming server 104. The digital asset data may be time-coded.

The digital asset server 108 also implements an event analysis module 109, which is configured to analyze live content streamed to the mobile device and identify digital asset data opportunities, as will be described in more detail in subsequent paragraphs. Digital asset data received by the digital asset server 108 is temporarily stored in a cache database 113.

According to a particular embodiment, for live video streaming content, the digital asset provider 106 will open a Web Socket connection with third-party digital asset providers (112a to 112n). As the live video stream progresses, the third parties will push digital asset data relevant to the live stream via the socket. The mobile device 120 will open another Web Socket to the digital asset provider 106 while streaming the content. The digital asset provider 106 may combine the digital asset data with data output by the event analysis module 109 and quick chat service 111. This combined data is then pushed to the mobile device via the Web Socket connection. All data is also cached in a database for playback at a later date.

For pre-recorded content, before the pre-recorded content is made available, the digital asset provider 106 will fetch the required digital asset data from the third-party providers (112a to 112n), run it through the event analysis system 109, and save the combined data in the cache database 113. When a user starts watching pre-recorded content, the mobile device will fetch the required digital asset data via an HTTP RESTful API to the digital asset provider 106, which will retrieve the data from the cache database 113.

It will be understood that in an alternative embodiment to that described above, the services provided by the digital asset provider 106 may be implemented by the streaming service 102 (i.e., as an integrated service).

The mobile device 120 communicates with both the streaming server 104 and digital asset server 108 over a suitable communications network, such as a broadband communications network 122.

Figure 3:
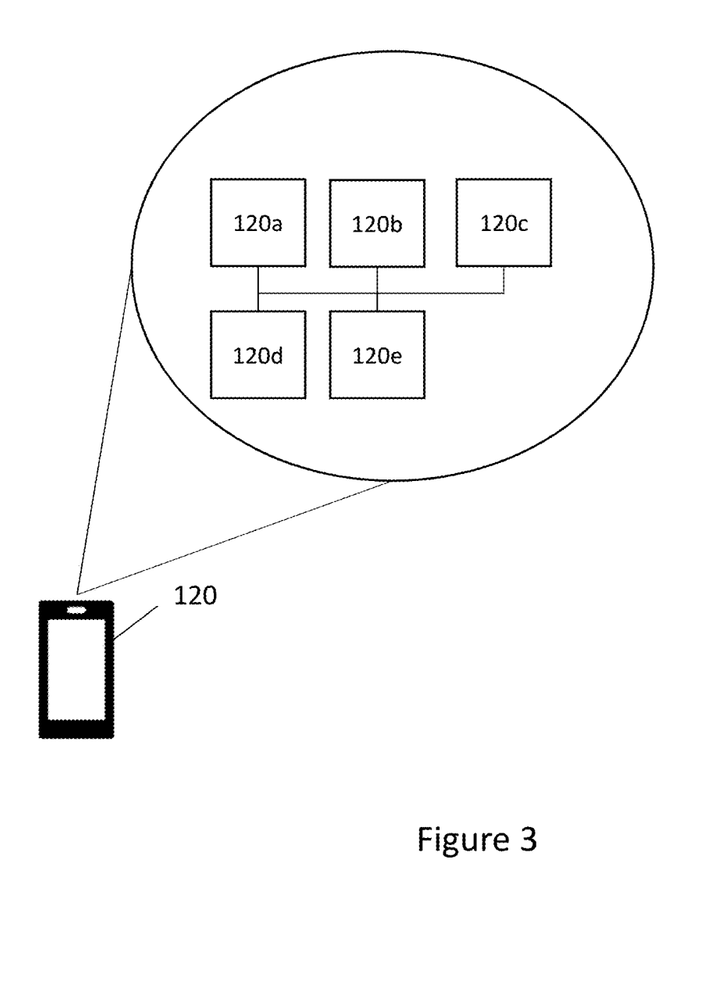
FIG. 3 is a schematic of a mobile device, in accordance with an embodiment of the present disclosure.

With additional reference to FIG. 3, the mobile device 120 comprises standard hardware, including a processing unit 120a, touch screen display 120b and memory 120c. The mobile device 120 also comprises a gyroscope 120d that is configured to sense and output data representative of pitch, roll and yaw of the mobile device 120. In addition, the mobile device 120 implements a camera 120e.

The processing unit 120a is configured to implement a suitable operating system (e.g., iOS, Android, or the like), that in turn is configured to run a mobile streaming client application 121 (hereafter "mobile application") that implements embodiments of the present disclosure.

Figure 4:
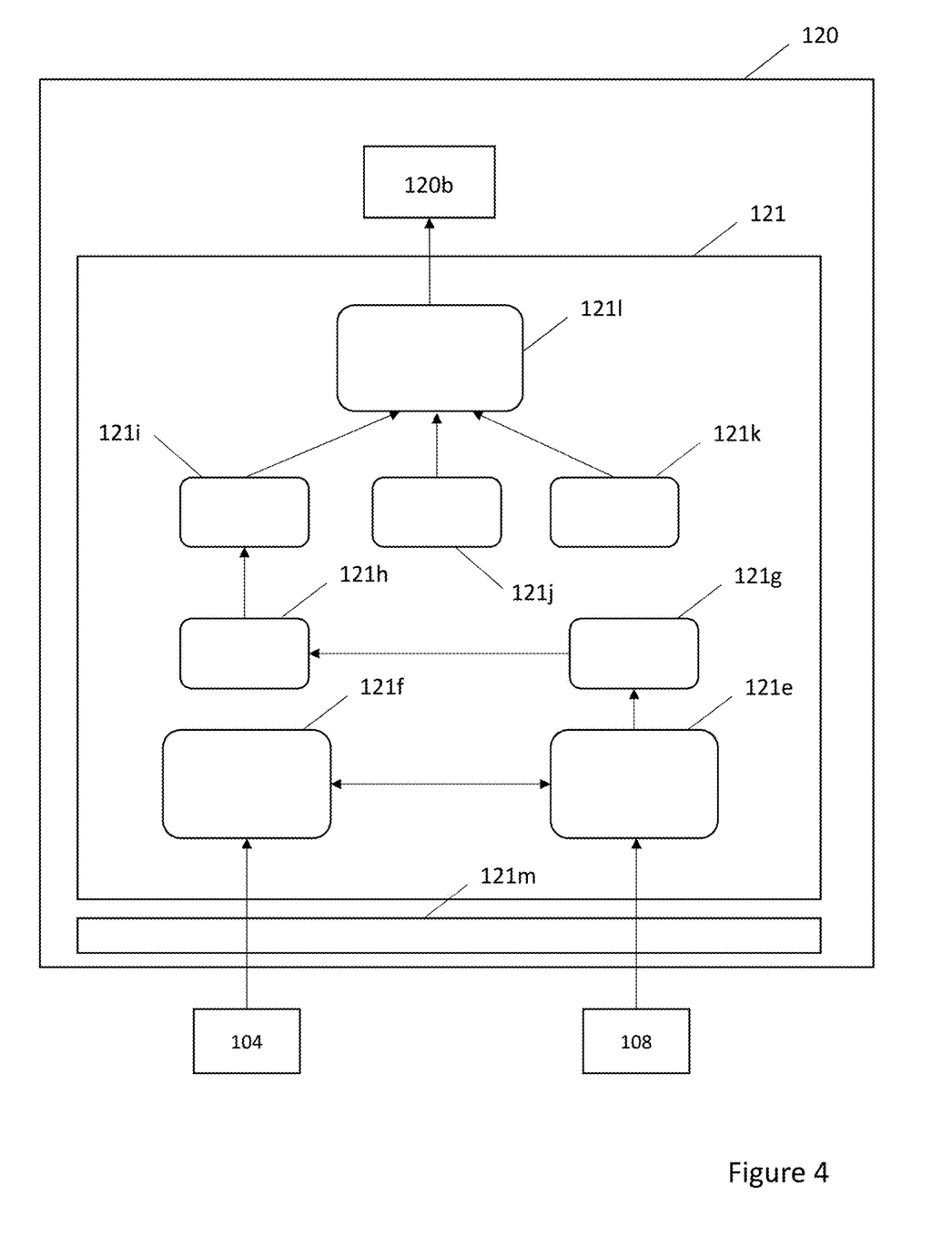
FIG. 4 is a schematic of a mobile application implemented by the mobile device of FIG. 3, in accordance with an embodiment of the present disclosure.

In more detail, and with additional reference to FIG. 4, the mobile application 121 implements a number of modules, based on program code stored in memory 120c. More particularly the modules include a real-time rendering engine 121e, digital content rendering engine 121f, frame building module 121g, render texture component, 121h, shader component 121i, three-dimensional mesh component 121j, shader component 121k, renderer 121l and event handler 121m.

As will be described in more detail in subsequent paragraphs, the rendering engine 121e is particularly configured to render the video stream to a three-dimensional image plane, with the ability to transition between the 2D format and 3D format based on a user instruction (or, in some embodiments, a system generated instruction triggered by a process that monitors for predefined conditions).

At the time of preparing this patent specification, a preferred approach for one embodiment is to utilize Nex-Player™ as a platform for providing media player functionalities, combined with the NexPlayer™ Unity plugin, which provides some baseline technology enabling integration of video playback and VR functionality that is able to support technology embodying aspects of the inventive content disclosed herein. No permissions or affiliations with either NexPlayer™ or Unity are suggested; these commercial platforms are provided as examples only. Various other forms of media player and VR platforms (for example, native VR SDKs for iOS and Android) may be used in further embodiments.

Transitioning Between 2D and 3D Formats

By way of example, the following describes a scenario whereby a user wishes to view a live basketball game on their mobile device 120. The digital asset data may take the form of player statistics, as well as e-store assets that can be selected for purchasing merchandise. A particular advantage of the transitioning process that will now be described is that it can be carried out in real time, providing a seamless transition between the two formats.

Figure 5:
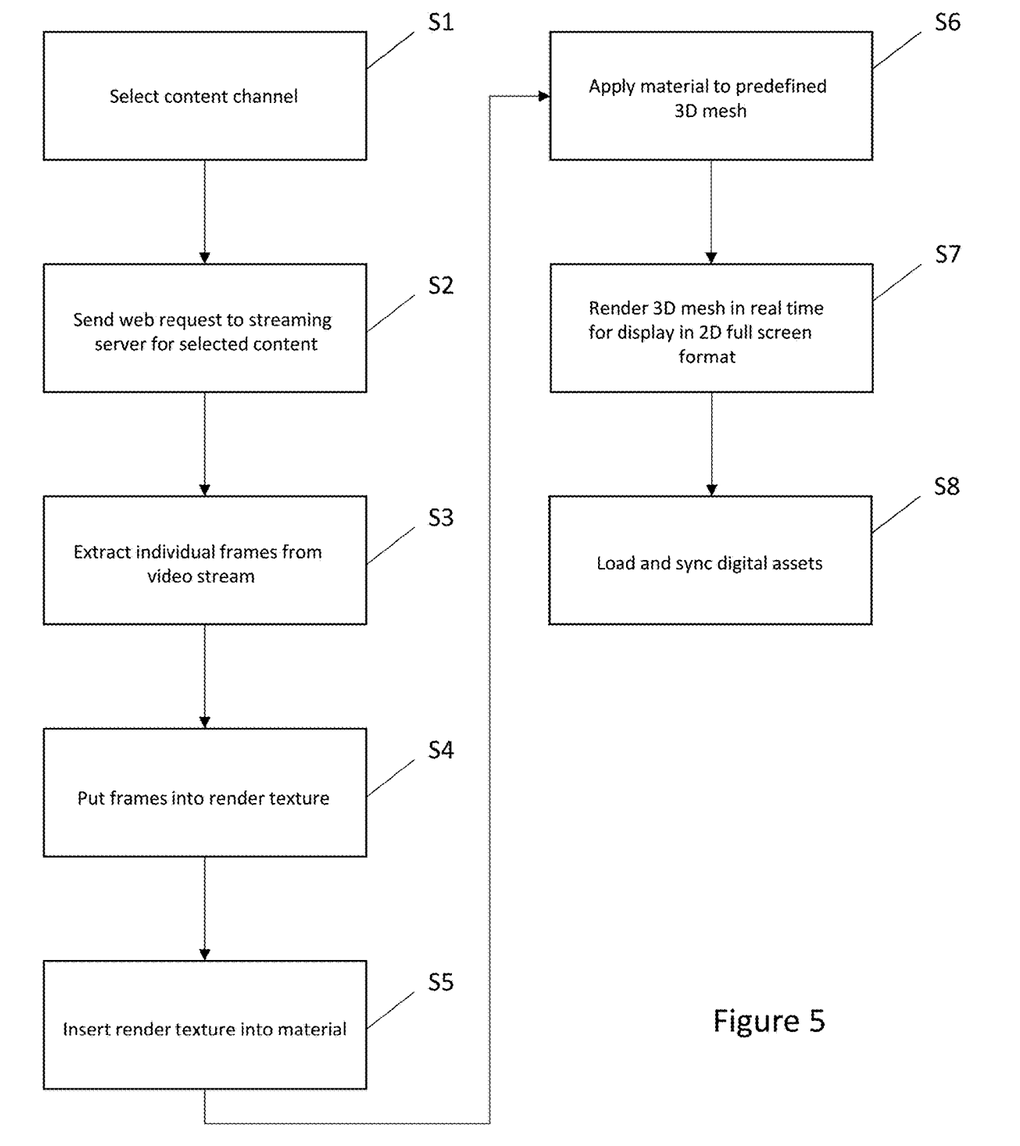
FIG. 5 is a process flow for displaying a stream in two-dimensional display format, in accordance with an embodiment of the present disclosure.

With additional reference to FIG. 5, the process for initializing the 2D format will first be described. The first step S1 involves the user selecting a content channel using the mobile application 121. As will be described below, once a channel has been selected the mobile application 121 is configured to load a three-dimensional interactive scene in 2D format using the real-time rendering engine 121e (ether via a 2D specific object, or a 3D object presented in a 2D fixed form). More specifically, the live video stream for the channel is rendered to a three-dimensional image plane that is sized and aligned to the aspect ratio and local orientation of the mobile device display 120b, thereby simulating traditional full-screen playback. The three-dimensional image plane is attached to the local camera 120e of the mobile device 120.

According to the illustrated example, when the user first opens the mobile application 121, they are presented with an interface that allows them to select the relevant channel for viewing a live basketball game stream on their mobile device 120.

At step S2, the mobile application 121 sends a web request message to the streaming server 104 requesting the selected video stream, which is subsequently delivered as an MPEG-Dash video (or alternate format) via one of the streaming service endpoints. It will be understood that playback of the video stream is activated by the rendering engine 121e, either by user input (as above) or as a scripted event.

As previously stated, the real-time rendering engine 121e and digital content rendering engine 121f are configured to render the video stream and synced digital asset data as separate objects within a three-dimensional virtual space, such that, during 3D format, each of the video accompanying digital content objects are displayed in a different spatial location to the video stream object.

In more detail, at step S3, the real-time rendering engine 121e initializes a frame building component 121g, which is configured to extract each frame from the video stream.

Each extracted frame is passed, at step S4, to a render frame building component 121g of the mobile application 121, which puts the frames into render texture.

At step S5 the render texture is inserted into a material by a material component 121h. As persons skilled in the art will understand, the material defines how a surface should be rendered, by including references to the textures it uses, tiling information color tints and the like. The available options for the material are governed by the shader component 121i.

At step S6, the material is applied to a predefined three-dimensional mesh by a renderer 121l. According to the illustrated embodiment, the predefined mesh comprises a rectangular mesh with UV coordinates mapped 1:1 and scaled to the video stream's aspect ratio, e.g., 16:9 at 1080p.

At step S7, the three-dimensional mesh is rendered in real time in three-dimensional virtual space using material properties from the material component 121h and shader instructions received from the shader component 121i.

At this point, the video is mapped and displayed on a three-dimensional image plane in 2D format simulating traditional full screen playback.

Finally, at step S8, the mobile application 121 requests digital event data (i.e., representative of digital asset data) from the digital asset server 108. The received digital event data is received by the event handler 121m. The event data is then loaded and kept synchronized in background processes ready for 3D format initialization (as will be described in subsequent paragraphs). In one embodiment, meta data associated with the stream is extracted and evaluated for use in determining what digital event data to request. According to such an embodiment, digital event data may be stored in association with one or more predefined meta data classifiers. In that instance, only digital event data classified with the same meta data identified in a request will be pushed to the mobile application 121.

Figure 6:
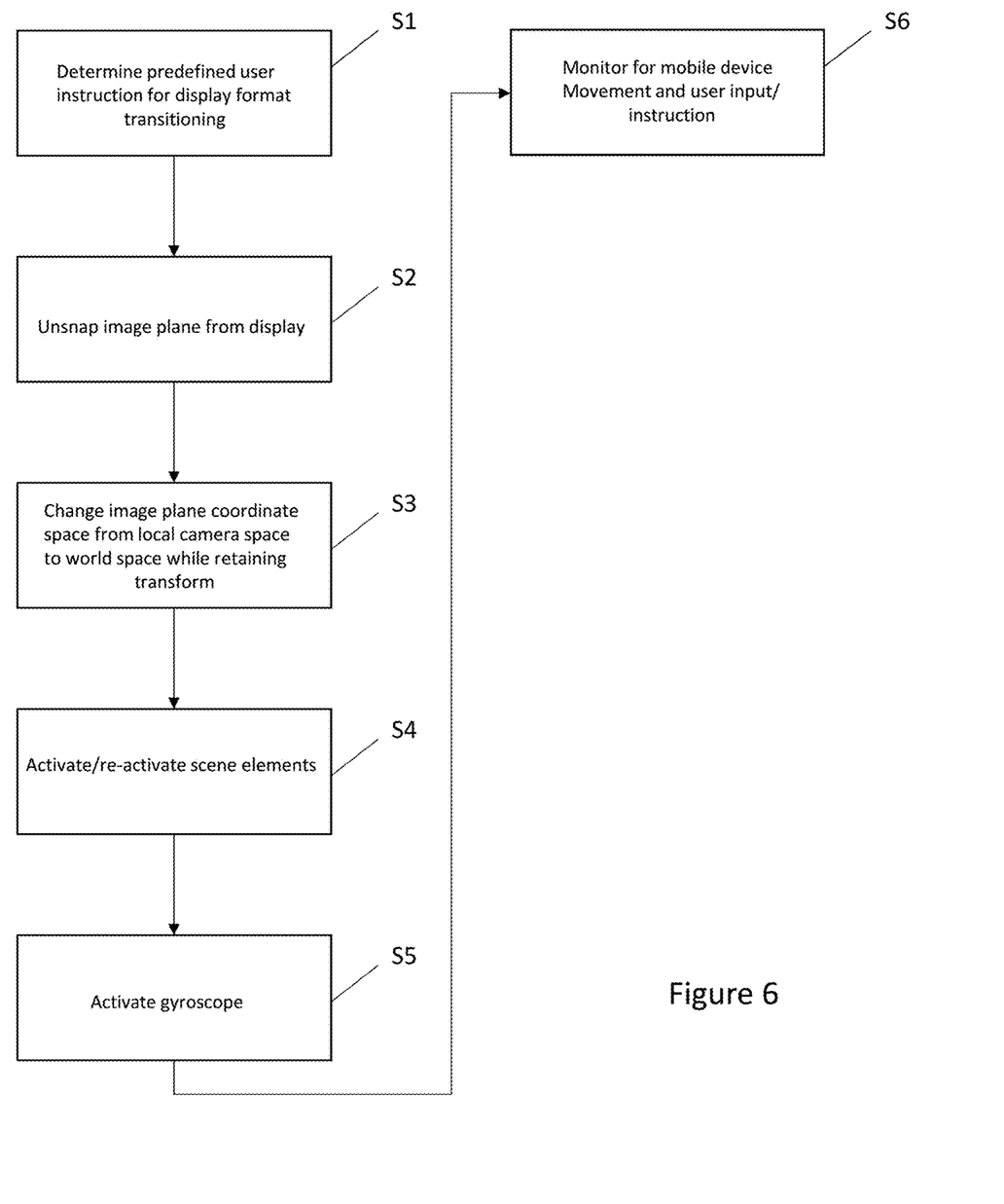
FIG. 6 is a process flow for transitioning from a two-dimensional display format to a three-dimensional display format, in accordance with an embodiment of the present disclosure.

FIG. 6 depicts a process flow for transitioning to 3D format. As shown, in step S1, a predefined user transitioning instruction is determined by the mobile application 121. The instruction may be any predefined user input, including, for example, a particular gesture received via a touch screen display or keypad, or a predefined movement of the device. According to the illustrated embodiment, the predefined input comprises a double-tap gesture made via the touch screen display 120b.

At step S2, responsive to determining the instruction, the mobile application 121 is configured to "unsnap" the image plane from the display and transform it in three-dimensional space.

More particularly, this involves, at step S3, changing the image plane coordinate space from local camera space to a virtual space coordinate system ("world space" or "three-dimensional virtual space") while retaining its transform (i.e., combined position, rotation and scale of the object in three-dimensional space) relative to the local camera. Over time, the image plane interpolates from original transform to anchored world space transform. It will be understood that the three-dimensional image plane may simulate any suitable large screen "media screen" for displaying the video stream. For example, the three-dimensional image plane may be rendered to look like a cinema screen, which is the centerpiece of the world space.

Figure 7:
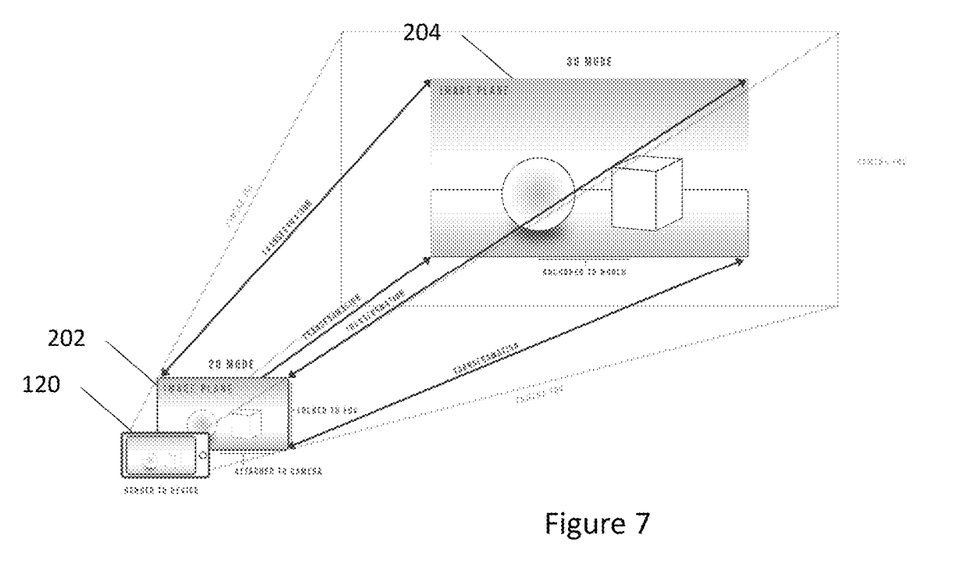
FIG. 7 is a schematic illustrating the transitioning process outlined in FIG. 6.

With reference to FIG. 7 there is shown a schematic illustrating transitioning of the image plane from 2D to 3D format. In FIG. 7, the image plane in 2D format is denoted by reference numeral 202, while the transformed image plane (i.e., in world space) is denoted by reference numeral 204.

At step S4, scene elements that are used to display the relevant digital asset data and other scene related visuals (e.g., background, particle effects, etc.) are activated/re-activated. In world space, the digital assets are rendered as three-dimensional objects. The three-dimensional objects may be anchored in any desired spatial location within the world space provided they do not overlap the three-dimensional image plane that displays the video stream. It will be understood that some scene elements may not display digital asset data and instead may include background and particle effects and the like.

At step S5, the mobile device gyroscope 120d is activated. According to the illustrated embodiment, movement of the mobile device 120 allows the user to navigate the world space. More particularly, movement of the mobile device 120 causes the gyroscope 120d to output data representative of pitch, yaw and roll of the mobile device 120 and these outputs are evaluated by the mobile application 121 for determining how to move a virtual camera attached to the world space. It will be appreciated that technologies other than gyroscopes may be used in alternate embodiments to provide the same practical results.

Figure 8:
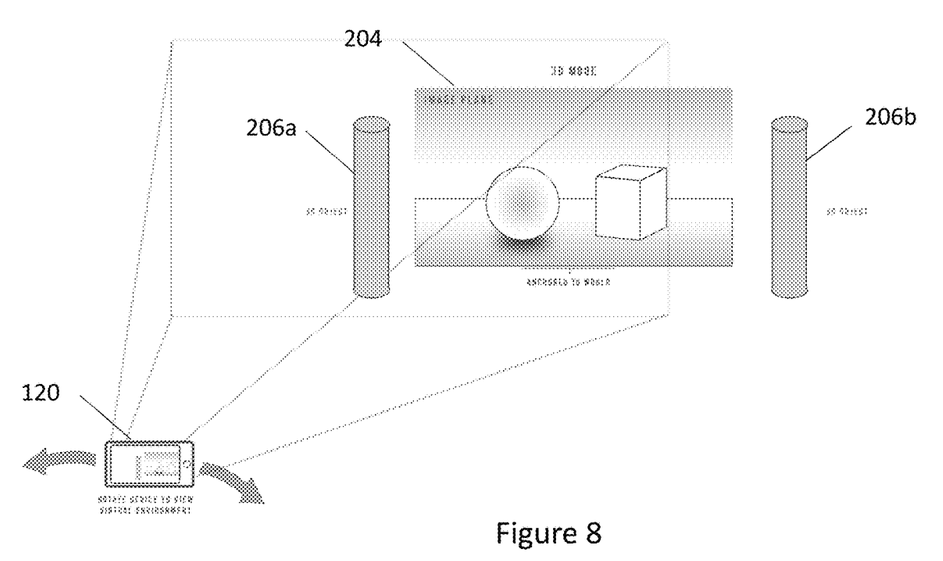
FIG. 8 is a schematic illustrating movement within a three-dimensional world space, in accordance with an embodiment of the present disclosure.

In more detail, in world space, the virtual camera is fixed in the center of the world space. When the mobile device 120 is held in front of the user and moved, the mobile application 121 is configured to correspondingly adjust the orientation of the virtual camera, thereby simulating looking around the world space. FIG. 8 schematically depicts movement of the virtual camera within an example world space. For the illustrated example, digital asset data in the form of player faces are rendered within columns 206a, 206b on either side of the image plane 204, which displays the live video stream.

At step S6, the mobile application monitors for device movement (i.e., for controlling the virtual camera) and user inputs that are representative of either a user selection or request to return to 2D format.

One or more of the scene elements may take the form of user interface elements that can be interacted with, e.g., by tapping on the mobile device touch screen display 120b.

With reference to the FIG. 8 example, the scene elements take the form of player faces that are rendered in individual boxes anchored in the vertical columns 206a, 206b one either side of the image plane. The player faces for one team may be rendered in the left column 206a, while the faces of the other team's players may be rendered in the right column 206b. Selecting one of the boxes (e.g., by touching the corresponding location on the touch screen display 120b) causes the mobile application 121 to load the relevant statistics for the selected player (which are kept synchronized in background processes, as previously described) and render those statistics in a visually aesthetic form within a further three-dimensional object anchored in the world space for viewing by the user.

Selecting the player, as above, may additionally cause a cap or jersey with the player's number to be rendered as an additional three-dimensional object within the world space with the text "store" displayed in association therewith. Selecting the player cap or jersey (again using the touch screen display 120b) causes the mobile application to display an e-store object listing various items of player merchandise that can be purchased by the user. In one embodiment, selecting an item in the e-store object causes the mobile application 121 to add the relevant item to a cart on a web store (that can be accessed via the mobile application 121) for later purchase.

A chat icon may also be rendered as a three-dimensional object that is anchored in world view. Selecting the icon causes the mobile application 121 to communicate with the chat service 111 to receive a live feed which is subsequently displayed in a chat box that is rendered as an object in the world view. A dialogue entry field in the chat box allows the user to input predefined phrases and emoticons which are communicated to the chat service 111 for incorporating into the live feed.

As previously mentioned, the digital objects may be synchronized with the live video stream and updated in real time to reflect events in the live video stream. In one form, this may be facilitated with the aid of the event analysis service 109. The event analysis service 109 is configured to analyze contextual data associated with the live video stream being delivered to the mobile device 120 and, based on the analysis, identify opportunities for presenting digital asset data.

By way of example, the event analysis service 109 may comprise a server that is configured to receive live time coded data representative of events within the game. The time coded data may, for example, be received from a statistic streaming service.

Responsive to determining a predefined event (e.g., Player X scored a point), the server of the event analysis service 109 sends a communication to the digital asset provider server 108, which triggers the digital asset provider server 108 to communicate e-store asset data for that player to the event handler 121m of the mobile application 121. If the mobile display is in 3D format, the event handler 121m will then cause the merchandise options for that player to be presented in an e-store three-dimensional object (as discussed above).

The event analysis service 109 may implement an artificial intelligence (AI) module that is configured to trigger the automatic identification and dynamic delivery of digital asset data in relation to "moments of interest" within the live stream and/or chat service.

By way of example, the AI module may determine, from the statistics stream, that Player 'X' has scored a 2-point basket. Player X is fouled while shooting and gets a free throw.

Further, the AI module may determine from the statistic stream that player X has a high number of baskets already this game.

Still further, an evaluation of the live feed data from the chat service 111 may indicate that there is currently a high volume of positive inputs.

Based on the collated data, the AI system may conclude that this is a high-level moment of interest for player X. In response, the event analysis service 109 sends data to the event handler 121*m* of the mobile application 121, which activates the relevant e-Store promotion and feedback for presenting as predefined scene elements in the world space.

A return to 2D format can be initiated at any time by the user entering a predefined instruction. Again, by way of example, this may comprise a double tap gesture made via the touch screen display device 120*b*. Responsive to determining the predefined instruction, the mobile application 121 hides the three-dimensional world view and re-snaps the three-dimensional image plane to the device screen, thereby returning to 2D format. More particularly, this involves changing the image plane coordinate space from world space to local camera space while retaining its transform relative to the camera. The image plane interpolates over time from original transform to new camera aligned transform (in local space). All other scene elements that are now hidden are deactivated.

It will be understood that when 3D format is initialized the 3D world view is aligned with the forward direction of the mobile device 120. The alignment may be reset by activation of the 2D format, by pointing the mobile device 120 in the direction of the desired forward vector and again activating 3D format.

Further Description of Embodiments

It will be appreciated that the disclosure above provides for technology whereby computer code is executed at either or both of a mobile device and server device thereby to cause rendering and operation of a user interface on a display screen of the mobile device, thereby to provide a technical solution to problems associated with a desire to provide an increased amount of content (for example, two-dimensional content such as video and web page data) in an environment with limited screen space.

For the further embodiments described below, the general architecture of FIG. 2 as described may be used. However, the functionality of rendering engine 121*e* is optionally modified for providing additional/alternate functionalities.

One embodiment provides a method for displaying content at a mobile device having a display screen, the method including:

(i) Configuring the mobile device to render a three-dimensional virtual space. The three-dimensional space need not be actually rendered at this point; the method may initially include accessing data representative of a space background (for example, a scene or stage) and one or more content display objects that are to be rendered at predefined locations in the three-dimensional virtual space. At least a subset of the objects are data-mapped to sources of two-dimensional content (for example, video data, web page content, animation content, and so on), and in some cases a buffering process is performed thereby to buffer a portion of content from each of the data-mapped sources thereby to facilitate fast loading of content when the three-dimensional virtual space and display objects is rendered.

(ii) Being responsive to an input (for example, a user input or an input defined by an event observed by software) to transition in a visually seamless manner between a first mode, which enables full-screen content viewing, and a second mode, which enables content navigation via the three-dimensional virtual space, as described below. The expression "visually seamless" means that the content being experienced is experienced in a continuous manner through the transition (for example, a video continues to play, although characteristics of an object in which the video is displayed vary, for example, by transitioning an object type, and a smooth variation in object position).

In the first mode, a content display object (which is configured to display two-dimensional content, for example, a video display object configured to display video streamed from a video source, or an object configured to display web page content and/or animations) is rendered to occupy substantially all of the display screen (for example, a full-screen view, which may include a UI boundary area). This may be presented as a conventional two-dimensional display object (for example, a conventional HTML video object), or as a three-dimensional object having a two-dimensional display pane on which two-dimensional content is displayed (e.g., transformed/projected). The former is preferable in the context of reducing processing complexity. In the case of the latter, the two-dimensional display pane is preferably aligned with the display screen, such that the video appears as a conventional two-dimensional video.

In the second mode, the same two-dimensional content is presented via a three-dimensional content display object in the three-dimensional virtual space, occupying less than about 75% of the display screen area (and hence allowing a user to also see, via a field-of-view through which the virtual environment is displayed, additional content in the three-dimensional virtual space).

Transitioning from the first mode to the second mode provides a visually seamless experience, in the sense that the user is able to continue seamlessly viewing the two-dimensional content, and navigate the three-dimensional virtual space thereby to in parallel view one or more further content display objects respectively configured to display dynamic content retrieved from remote content sources. The seamless viewing may be affected by either:

Where the first mode makes use of a conventional two-dimensional display object, and the second mode makes use of a three-dimensional content display object, substantially synchronizing content playback between the objects such that (for example) a final frame of video displayed via the dimensional display object is sequential or close to sequential in the context of the video to a first frame of video presented by the three-dimensional display object.

Where the first mode makes use of a three-dimensional display object (positioned such that it is presented to appear as a substantially full-screen two-dimensional object), a seamless transition is achieved via shifting the viewpoint in the three-dimensional space (away from the three-dimensional object, thereby to reveal its surrounding).

It will be appreciated that the transition may occur in either direction, thereby to allow a user to switch between full-screen viewing and partial screen viewing in the three-dimensional virtual environment. The three-dimensional virtual environment is able to be navigated by user input (including, for example, motion input that is processed by an IMU and/or camera a module, or touchscreen input) to allow simultaneous viewing of multiple further content display objects respectively configured to display dynamic content retrieved from remote content sources. In some embodiments any of these content display objects may be launched into the full-screen mode. The input that triggers transition between the modes may include a touchscreen input (for example, a double tap on a content display object, or other touchscreen interaction), an alternate user command (for example, audible, tactile, button, or the like), or an autonomously triggered process (for example, based on rules executed in a software module—for example, a rule to autonomously exit the full screen mode and enter the second mode in response to a data-driven trigger, timer, or the like).

When in the second mode, a touch mapping module is configured to recognize touchscreen interactions with the three-dimensional space, and translate those into interactions with two-dimensional content presented in the content display objects. In this manner, a user is able to, for example, click a button presented in a webpage even when that webpage is presented in a projected/translated form via rendering on a display pane of a three-dimensional object in the three-dimensional environment. That is, for at least one of the content display objects presented in the three-dimensional environment, the two-dimensional content includes interactive content (for example, GUI buttons and the like), and a touch interaction mapping module is configured to map a user interaction location defined relative to the display screen when the three-dimensional virtual space is displayed to two-dimensional coordinates defined relative to the two-dimensional content, thereby to enable interaction with the two-dimensional content via the three-dimensional environment.

The technology described above also results in a method for providing data to a navigable video-centric user interface on a mobile device having a display screen, wherein the mobile device is configured to perform a method including: rendering a three-dimensional virtual space; rendering in the three-dimensional virtual space a plurality of content display objects, wherein each content display object includes two-dimensional display pane configured for presenting two-dimensional content; data mapping each of the content display objects with a source of two-dimensional rendering content, such mobile device is operable to retrieve from respective designated locations two dimensional content for display by the content display objects, such that the two-dimensional content is transformed and presented in the three-dimensional virtual space; and enabling field-of-view navigation of the three-dimensional virtual space via user inputs delivered to the mobile device, thereby to allow a user of the mobile device to selectively view desired portions of the video content display object and one or more further content display objects.

One embodiment provides a method for providing a navigable video-centric user interface on a mobile device having a display screen, the method including:

Rendering of a video content display object on the display, wherein the video content display object is configured to present two-dimensional video data retrieved from a video data source (for example, a local source, or a streaming source). The rendering includes rendering the video content display object as a three-dimensional object in a three-dimensional virtual space, such that the video content display object includes a two-dimensional display pane on which the two-dimensional video data is presented.

Rendering in the three-dimensional virtual space one or more further content display objects, the one or more further content display objects being configured to present two-dimensional content retrieved from respective two-dimensional content data sources.

Enabling field-of-view navigation of the three-dimensional virtual space via user inputs delivered to the mobile device, thereby to allow a user of the mobile device to selectively view desired portions of the video content display object and one or more further content display objects.

The above method may be performed with or without functionality for transitioning between full-screen/three-dimensional view modes as described above. Without the transitioning, this nevertheless provides a useful mobile device interface that allows for convenient navigation between items of two-dimensional content, using technology intended for navigation of a three-dimensional environment. In that regard, content display objects each have respective two-dimensional display planes that, respectively, display two-dimensional content, these being substantially directed toward a common point in the three-dimensional virtual space (that point being a virtual point from which a user viewport is defined—the user preferably navigates by rotation and optionally zoom, but not by horizontal or vertical positional translation). In some embodiments functionary is probated thereby to, in response to a defined form of user interaction with the interactive content (for example, clicking a button associated with additional content, such as a hyperlink or other control), a user interface control module is configured to launch and render one or more additional content display objects, these also being configured to present two-dimensional content retrieved from respective two-dimensional content data sources. These are preferably presented in the three-dimensional virtual environment at a greater distance from a central object than one or more currently-displayed objects. That is, the interface has a central content display object, a first tier of content display objects in a first zone around that central content (for example, "around" in the context of a given three-dimensional setting), and one or more further tiers that extend outwards as additional content display objects are invoked.

Further Detail of System Configuration

According to the illustrated embodiment, the mobile devices are Internet-enabled smartphones. The smartphones are equipped with the necessary hardware and software to communicate with the relevant services. The smartphone and relevant services communicate over a network, which is a mobile broadband network in this case. Although not illustrated in FIG. 2, the network includes standard network elements including a base station controller, home location register, mobile switching center, message center, equipment identity register, and message gateway (although it will be appreciated that any suitable network connection may be utilized including private/public wireless networks, etc.).

Details of such devices (e.g., processor, memory, displays, data storage devices) are omitted for the sake of clarity.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flowchart illustrations and/or block diagrams of methods, apparatus (systems) and computer program products according to embodiments of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions, which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions, which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The computer program product may comprise all the respective features enabling the implementation of the methodology described herein, and that—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The terminology used herein is for the purpose of describing particular embodiments only and is not intended to be limiting of the present disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of embodiments of the present disclosure has been presented for purposes of illustration and description, but is not intended to be exhaustive or limited to the embodiments in the form disclosed. Many modifications and variations will be apparent to those of ordinary skill in the art without departing from the scope and spirit of the present disclosure. The embodiment was chosen and described in order to best explain the principles of the present disclosure and the practical application, and to enable others of ordinary skill in the art to understand the present disclosure for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The terms "computer system" and "computer network" as may be used in the present disclosure may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present disclosure may include and may be included within fixed and portable devices such as desktop, laptop, and/or server. A module may be a component of a device, software, program, or system that implements some "functionality," which can be embodied as software, hardware, firmware, electronic circuitry, or etc.

Although specific embodiments of the present disclosure have been described, it will be understood by those of skill in the art that there are other embodiments that are equivalent to the described embodiments. Accordingly, it is to be understood that the present disclosure is not to be limited by the specific illustrated embodiments, but only by the scope of the appended claims.

It should be appreciated that in the above description of exemplary embodiments of the present disclosure, various features of the present disclosure are sometimes grouped together in a single embodiment, FIG., or description thereof for the purpose of streamlining the disclosure and aiding in the understanding of one or more of the various inventive aspects. This method of disclosure, however, is not to be interpreted as reflecting an intention that the claimed present disclosure requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this present disclosure.

Furthermore, while some embodiments described herein include some but not other features included in other embodiments, combinations of features of different embodiments are meant to be within the scope of the present disclosure, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the present disclosure.

In the description provided herein, numerous specific details are set forth. However, it is understood that embodiments of the present disclosure may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B, which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the present disclosure, those skilled in the art will recognize that other and further modifications may be made thereto without departing from the spirit of the present disclosure, and it is intended to claim all such changes and modifications as falling within the scope of the present disclosure. For example, any formulas given above are merely representative of procedures that may be used. Functionality may be added or deleted from the block diagrams and operations may be interchanged among functional blocks. Steps may be added or deleted to methods described within the scope of the present disclosure.

What is claimed is:

1. A computer implemented method for providing a navigable video-centric user interface on a mobile device having a display screen, the method including:
   rendering of a video content display object on the display screen, wherein the video content display object is configured to present two-dimensional video data retrieved from a video data source, wherein the rendering includes rendering the video content display object as a three-dimensional object in a three-dimensional virtual space, such that the video content display object includes a two-dimensional display pane on which the two-dimensional video data is presented,
   rendering in the three-dimensional virtual space one or more further content display objects, the one or more further content display objects being configured to present two-dimensional content retrieved from respective two-dimensional content data sources; and enabling field-of-view navigation of the three-dimensional virtual space via user inputs delivered to the mobile device, thereby to allow a user of the mobile device to selectively view desired portions of the video content display object and one or more further content display objects.

2. The method of claim 1, including being responsive to a predefined input thereby to transition between:
   (i) rendering the video content display object to occupy substantially all of the display screen, such that a remainder of the three-dimensional virtual space is outside a current field of view, and concurrently preventing field-of-view navigation of the three-dimensional virtual space such that the video content display object appears as a fixed two-dimensional video display object; and
   (ii) rendering the video content display object to occupy less than about 75% of the display screen, thereby to provide a field of view of the three-dimensional virtual space that includes at least a portion of at least one of the further content display objects, and concurrently enabling field-of-view navigation of the three-dimensional virtual space.

3. The method of claim 1, wherein at least one of the one or more further content display objects includes a two-dimensional display pane on which the two-dimensional content is presented.

4. The method of claim 1, wherein, for at least one of the one or more further content display objects, the two-dimensional content includes web page content.

5. The method of claim 1 wherein, for at least one of the one or more further content display objects, the two-dimensional content includes interactive content, and wherein a touch interaction mapping module is configured to map a user interaction location defined relative to the display screen when the three-dimensional virtual space is displayed to two-dimensional coordinates defined relative to the two-dimensional content, thereby to enable interaction with the two-dimensional content via the three-dimensional environment.

6. The method of claim 1, wherein, for at least one of the one or more further content display objects, the two-dimensional content includes interactive content, and wherein in response to a defined form of user interaction with the interactive content, a user interface control module is configured to launch and render one or more additional further content display objects, the one or more additional further content display objects being configured to present two-dimensional content retrieved from respective two-dimensional content data sources.

7. The method of claim 6, wherein the one or more additional further content display objects are presented in the three-dimensional virtual environment at a greater distance from the content display object on a display than the one or more further content display objects.

8. The method of claim 1, wherein the video content display object and the one or more further content display objects are positioned in the three-dimensional virtual environment such that each have respective two-dimensional display planes that respectively, display two-dimensional content are substantially directed toward a common point in the three-dimensional virtual space.

9. A computer implemented method for providing video accompanying digital content on a display of a mobile device, the method comprising:

displaying a video stream on the mobile device display in a two-dimensional display format; and responsive to determining an instruction for the video accompanying digital content, causing the display of the mobile device to transition from the two-dimensional display format to a three-dimensional display format, the transition step comprising:
   rendering the video stream and video accompanying digital content as separate objects within a three-dimensional virtual space such that the video accompanying digital content display object is displayed in a different spatial location to the video stream object thereby ensuring that the video stream displayed by a corresponding object is unobstructed by the video accompanying digital content.

10. The method of claim 9, wherein, when in the three-dimensional display format, the three-dimensional virtual space can be navigated by a user of the mobile device to view a desired one or more of rendered objects, the navigation affected by movement of the mobile device in real space.

11. The method of claim 9, wherein rendered objects are spatially anchored within the three-dimensional virtual space.

12. The method of claim 11, wherein, when in the two-dimensional display format, the video stream is mapped and displayed in a three-dimensional image plane that is sized and aligned to an aspect ratio and local orientation of the display of the mobile device.

13. The method of claim 12, wherein the step of transitioning comprises transforming the three-dimensional image plane.

14. The method of claim 13, wherein the image plane is attached to the mobile device's local camera and wherein the step of transitioning further comprises changing a coordinate space from a local camera coordinate system to a virtual space coordinate system while retaining the transform of the image plane relative to the local camera.

15. The method of claim 14, wherein, when in the three-dimensional format, the image plane interpolates over time from original transform to anchored virtual space transform.

16. The method of claim 12, wherein, responsive to determining an instruction for returning to the two-dimensional format, the method further comprises hiding the three-dimensional virtual space and re-snapping the image plane to the display of the mobile device for full screen viewing.

17. A method for displaying content at a mobile device having a display screen, the method including:
   configuring the mobile device to render a three-dimensional virtual space; and
   being responsive to an input to transition in a visually seamless manner between:
      a first mode, which includes rendering a content display object to occupy substantially all of the display screen, wherein the content display object is configured to display two-dimensional content; and
      a second mode, which includes rendering a three-dimensional content display object in the three-dimensional virtual space, wherein the three-dimensional display object displays the same two-dimensional content; and
   such that by transitioning from the first mode to the second mode, a user is able to continue seamlessly viewing the two-dimensional content, and navigate the three-dimensional virtual space thereby to in parallel view one or more further content display objects respectively configured to display dynamic content retrieved from remote content sources.

18. The method of claim 17, wherein in the second mode there are rendered a plurality of three-dimensional display objects, each configured to display two-dimensional content from respective content sources, each having a respective two-dimensional display pane faced toward a common point defined in the three dimensional space.

19. The method of claim 17, wherein the plurality of three-dimensional display include at least one object that displays streaming video data, and one object that displays web page content.

20. The method of claim 17, wherein the three-dimensional virtual space is user navigable via motion of the mobile device.

\* \* \* \* \*